United States Patent [19]

Elsbett et al.

[11] 4,207,808
[45] Jun. 17, 1980

[54] PISTON FOR RECIPROCATING INTERNAL COMBUSTION ENGINES, TYPICALLY DIESEL ENGINES

[76] Inventors: Ludwig Elsbett; Günter Elsbett, both of c/o Industriestrabe 14, 8543 Hilpoltstein, Fed. Rep. of Germany

[21] Appl. No.: 898,152

[22] Filed: Apr. 20, 1978

[30] Foreign Application Priority Data

Apr. 21, 1977 [DE] Fed. Rep. of Germany ....... 2717692

[51] Int. Cl.² .............................. F16J 1/00; F16J 1/08
[52] U.S. Cl. ........................................ 92/158; 92/190; 92/216; 92/239
[58] Field of Search ................. 92/190, 216, 219, 238, 92/186, 239, 158, 159; 123/193 P, 41.35, 41.37, 41.38

[56] References Cited

U.S. PATENT DOCUMENTS

| 1,345,911 | 7/1900 | Cummins | 123/41.35 |
|---|---|---|---|
| 1,373,291 | 3/1921 | Betker | 92/176 |
| 1,659,799 | 2/1928 | Austin | 92/239 X |
| 2,416,429 | 2/1947 | Boucher | 92/158 |
| 3,730,163 | 5/1973 | Elsbett et al. | 123/193 P |
| 3,805,677 | 4/1974 | Clary et al. | 92/216 X |
| 3,906,924 | 9/1975 | Elsbett | 123/193 P |
| 4,056,044 | 11/1977 | Kammann et al. | 123/41.35 |
| 4,083,292 | 4/1978 | Goloff | 92/186 X |
| 4,129,108 | 12/1978 | Elsbett et al. | 123/193 P |

FOREIGN PATENT DOCUMENTS

| 2545588 | 4/1977 | Fed. Rep. of Germany | 123/193 P |
|---|---|---|---|
| 2545589 | 4/1977 | Fed. Rep. of Germany | 123/193 P |
| 333878 | 8/1930 | United Kingdom | 123/193 P |

*Primary Examiner*—Irwin C. Cohen
*Attorney, Agent, or Firm*—Buell, Blenko & Ziesenheim

[57] ABSTRACT

An improved piston structure for Diesel and like reciprocating piston engines is provided having a top and foot, a sealing section on said piston connecting said top and foot, a guide section articulatedly connected to said sealing section through trunnion means on a connecting rod, said guide section having a sliding shell in the form of a collar at its periphery surrounding a wrist pin in the region of its bearing points, and at least one rib for each bearing side in the form of a chord connected to said shell in the region of the bearing point.

8 Claims, 4 Drawing Figures

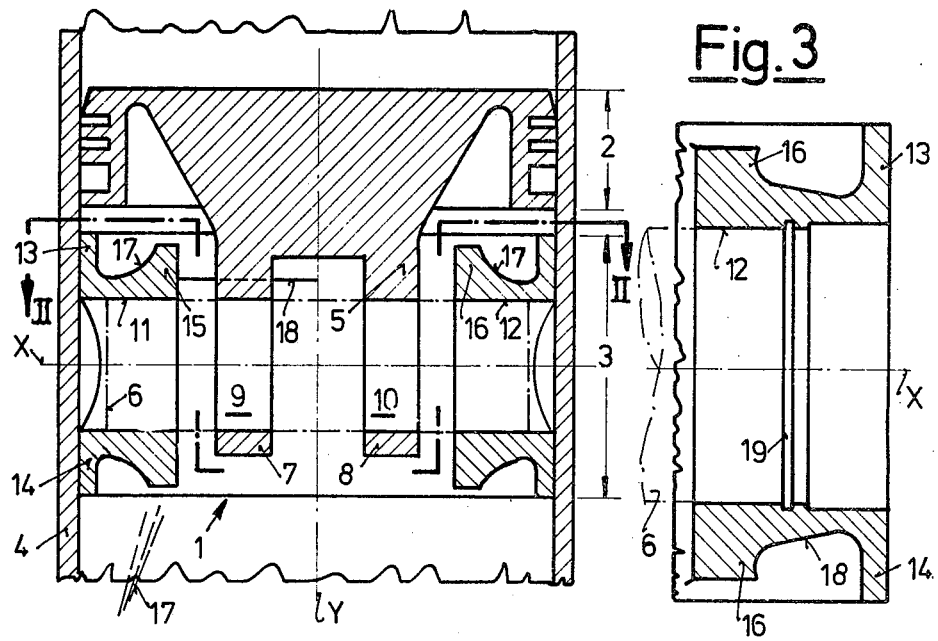
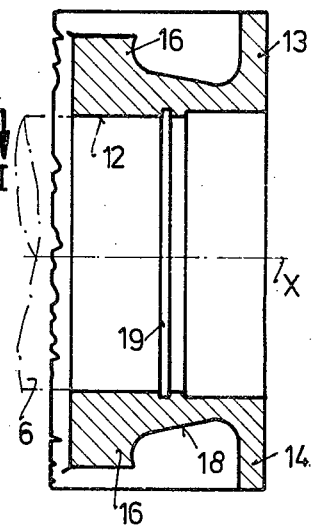
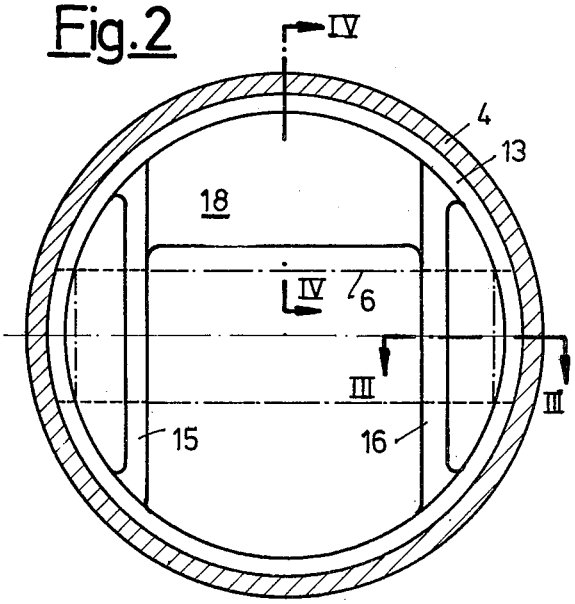
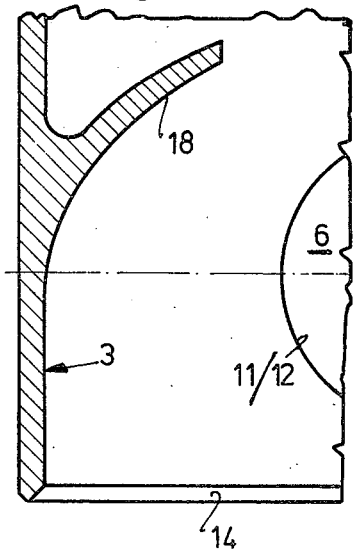

PISTON FOR RECIPROCATING INTERNAL COMBUSTION ENGINES, TYPICALLY DIESEL ENGINES

This invention relates to a piston for reciprocating internal combustion engines, typically Diesel engines, which is formed by a sealing section connecting a crown of the piston with its base which sealing section is articulately connected via the base to a pin bearing of a connecting rod on a guiding section, said guiding section serving to transmit normal forces due to the oblique position of the connecting rod.

Pistons of high speed reciprocating internal combustion engines, such as Otto cycle or Diesel engines, are as a rule subjected to high alternating stresses and, consequently, they are required to meet high standards of running and structural stability. With this in mind, pistons of recent designs are frequently subdivided into two sections, one so called sealing section and another so called guiding section, the two sections being interconnected in an oscillating manner by a pin bearing.

According to an earlier proposal for a piston of this kind, the one section, the so-called sealing section is formed by a piston crown with an adjoining ring carrier mounting both sealing and oil control rings and a shell connecting the crown with the base of the piston. This section of the piston is articulately jointed by a wrist pin to another section, the so called guiding section. The guiding section is preferably formed by a ring-shaped body with shell surfaces sliding on the walls of a cylinder. The shell surfaces of this guiding section may be constructed as collars which, cantilevered from a plane passing through one bearing of the wrist pin extend towards either end. In order to achieve also good lubrication of such a piston, in particular, its wrist pin and, consequently, its pin bearing, the guiding section is provided with flow-control surfaces within its shell which flow-control surfaces extend from the rim of the shell towards the pin bearing in a manner to assist favourable flow and force coolant and/or lubricant sprayed from the crank space of the internal combustion engine against the piston and its guiding section to flow to the bearing. In a piston according to this earlier disclosure flow control surfaces may be provided within its shell both to cause coolant and/or lubricant to flow to the pin bearing and to discharge these media after cooling and lubrication of the pin bearing has been effected on the other side on the shell, these additional flow-control surfaces deflecting the media back into the crank space. In this manner, it is possible both to provide very intensive cooling and lubrication of the pin bearing and dissipation of the heat due to combustion which builds in the combustion chamber of the piston so that damage is unlikely to occur in this piston. The bearing of the wrist pin in this guiding section is located in the area of the collars and the free ends of the wrist pin bear against these wall areas of the collars. However, investigations have shown that in consequence of the alternating stressing of the piston, especially when a piston seizes in a cylinder, very high stresses are set up at the bearings which are liable to cause damage of the pin bearings (see German patent application P 25 43 487.0).

In view of this, the present invention has for its object to improve a piston of the type initially referred to in a manner that the bearings for the wrist pin on the guiding section will withstand these high stresses without the need to make substantial changes to the basic concept of this guiding section.

According to the invention, this object is achieved by providing the guiding section with at least one rib associated with each bearing in the form of a chord connecting the sliding shell in the region of the respective bearing in addition to a collar-shaped sliding shell provided on its perimeter and extending all round in the region of the bearings of the wrist pin.

These features ensure that not only is the task underlying the invention solved in an advantageous manner but a bearing is created on the guiding section which warrants wide-base guidance and supports of the wrist pin on the guiding section with pressures being distributed uniformly and over a wide area. Another advantage of the features of this invention derives from the fact that, by forming this bearing with the rib, the guiding section is constructed with such a high strength that even if a piston seizes in the cylinder the wrist pin which imposes a pulling effect will not be capable of rupturing the guiding section, especially at the bearing so that it is possible both to positively eliminate bearing damage and to prevent major damage to the internal combustion engine.

For further advantageous developments of the piston, reference is made in particular to the remaining subclaims.

A typical embodiment of the piston according to the invention is schematically shown in the drawing in which:

FIG. 1 is a longitudinal central section through a piston consisting of sealing and guiding sections, FIG. 2 is a section along the plane II—II in FIG. 1 in which the sealing section is not shown but the complete guiding section is shown with one half of the illustration showing the guiding section provided with a flow-control surface directing a spray medium to the wrist pin, FIG. 3 is a section along the plane III—III in FIG. 2 and FIG. 4 is a section along the plane IV—IV in FIG. 2.

A piston 1 for reciprocating internal combustion engines which is essentially formed by a sealing section 2 exposed to the heat of the combustion gases and a guiding section 3 which is not exposed to this heat of the combustion gases is arranged axially slideably in a cylinder 4 of the internal combustion engine and the two sections are connected together via a base 5 of the piston and a wrist pin 6 provided in the region of a transverse central plane X of the guiding section. The connection of the sealing section 2 of the piston 1 with its guiding section 3 via the wrist pin 6 is effected via two legs 7, 8 provided in the region of the base of the piston, the legs having eyes 9, 10 for the wrist pin in which holes the wrist pin is guided on the guiding section in addition to its bearings 11, 12. The bearings 11, 12 of the wrist pin 6 are located in the region of a sliding shell of the preferably cylindrical guiding section 3 which is guided along the wall of the cylinder 4 and which in the region of this wall of the cylinder is provided with cantilever-shaped collars 13, 14 which project out towards either end from the transverse central plane X of the guiding section. In addition to these collars 13, 14, reinforcements are provided at the bearings 11, 12 for the wrist pin 6 in a manner that ribs 15, 16 formed as chords adjoining the collars, these ribs being also constructed cantilever fashion to connect the shell of the guiding section 3. These ribs 15, 16 may have the same depth relative to the transverse central plane X as the collars 13, 14 of the guiding section 3 or, as shown in the embodiment illustrated, they may be of a slightly smaller depth. Irrespective of this, it can be desirable to form these ribs 15, 16 with a greater cross-sectional area than that of the collars 13, 14 in order to make the bearings 11, 12 stronger. The ribs 15, 16 reinforcing the bearings 11, 12 in the region of the collars 13, 14 are in this embodiment connected by a neck 17 which slopes towards the collars, to the shell of the guiding section 3 and, together with the collars, provides the reinforcement of the bearing required for the wrist pin which in the embodiment illustrated is constructed so as to be capable of withstanding even excessive stressing of the bearings in the event of a piston 1 seizing in the cylinder 4. These additional reinforcements of the bearings 11, 12 by means of ribs 15, 16 on the guiding section 3 are preferably arranged symmetrically relative to a longitudinal plane Y extending through the piston 1 and may in case the wrist pin 6 of the piston 1 is supplied with coolant or lubricant 17 to be sprayed from a crank space also be connected to the flow-control surfaces 18 directing this medium to the wrist pin. The flow-control surfaces 18 joined to the inner surface of the guiding section extend substantially to the wrist pin 6 with a shape providing favourable flow conditions so that coolant and/or lubricant 17 emitted from the crank space flows or flow along the flow control surfaces 18 to reach the wrist pin from where this medium can be returned into the crank space along further flow-control surfaces 8 on the other side arranged symmetrically relative to the longitudinal axis Y of the piston 1. The connection of the ribs 15, 16 and flow-control surfaces 18 may, as shown in the plan view of the guiding section 3 in FIG. 2, constitute an inseparable connection, i.e. the ribs together with the flow-control surfaces of the other parts of the guiding section will form an integral unit Since, as a rule, locating of the wrist pin 6 in its bearings 11, 12 appears desireable, it is possible to provide the bearings with grooves 19 for retaining rings not shown in the drawing and it is also conceivable to fit these bearings with the usual sliding-contact bushes which may also be of the self-lubricating type.

In the foregoing specification we have set out certain preferred practices and embodiments of this invention, however, it will be understood that this invention may be otherwise embodied within the scope of the following claims.

We claim:

1. In a piston for reciprocating internal combustion engines, typically Diesel engines, having a generally cylindrical sealing section, piston sealing rings in grooves in said sealing section, said sealing section carries a crown of the piston, said crown of the piston having a base and depending legs extending through the sealing section with wrist pin openings in said legs, a generally cylindrical guide section spaced from and coaxial with the sealing section and surrounding said legs, wrist pin openings in said guide section, bearings in said opening, which piston is articulately jointed via the base and legs to a pin bearing of a connecting rod and to said guiding section serving to transmit normal forces due to the oblique position of the connecting rod, the improvement comprising an annular collar-shaped sliding shell on said guiding section, said collar-shaped shell defining a wall being located on the perimeter of said guiding section and extending around and supporting the region of the bearings of the wrist pin and at least one rib formed on said guiding section and associated with and reinforcing each bearing, said rib being in the shape of a chord connecting opposed portions of the annular sliding shell on opposite sides of the respective bearing.

2. A piston as in claim 1, wherein the rib at each bearing is formed as a reinforced web with a depth matched to the height of the wall of the sliding shell.

3. A piston as in claims 1 or 2, wherein the width of the web is greater than the wall thickness of the sliding shell.

4. A piston as in claim 1, including a flow control surface connected to said guide section, wherein each rib is connected to the side of an adjoining flow-control surface.

5. An improved piston structure for reciprocating piston internal combustion engines especially Diesel engines, comprising a piston, a generally cylindrical sealing section on said piston, piston sealing ring grooves surrounding said sealing section, a crown on one end of said sealing section, a depending base and legs of said crown extending through and beyond the other end of said sealing section and having wrist pin openings in said legs, a generally cylindrical guide section spaced from said other end of said sealing section, wrist pin openings in said guide section, a wrist pin extending through said wrist pin opening and connecting said sealing section on a connecting rod, bearings in said wrist pin openings, said guide section having a sliding shell defined by a wall in the form of an annular collar at its periphery surrounding said wrist pin in the region of its bearing, and at least one rib for reinforcing each bearing in the form of a chord connected to said opposed portions of said shell on opposite sides of the bearing.

6. A piston according to claim 5, wherein the rib at each bearing is formed as a reinforced web with a depth matched to the height of the wall of the sliding shell.

7. A piston according to claims 5 or 6, wherein the width of the web is greater than the wall thickness of the sliding shell.

8. A piston according to claim 5, including a flow control surface connected to said guide section, wherein each rib is connected to the side of an adjoining flow-control surface.

* * * * *